United States Patent
Zhai et al.

(10) Patent No.: US 10,322,464 B2
(45) Date of Patent: Jun. 18, 2019

(54) WELDING SYSTEM AND METHOD OF CONTROL

(71) Applicant: ArvinMeritor Technology, LLC, Troy, MI (US)

(72) Inventors: Yang Zhai, Rochester Hills, MI (US); John Kelly, Grosse Pointe Farms, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 421 days.

(21) Appl. No.: 15/049,181

(22) Filed: Feb. 22, 2016

(65) Prior Publication Data
US 2017/0239745 A1    Aug. 24, 2017

(51) Int. Cl.
| | |
|---|---|
| *B23K 9/10* | (2006.01) |
| *B23K 9/12* | (2006.01) |
| *B23K 9/133* | (2006.01) |
| *B23K 9/173* | (2006.01) |
| *H05B 6/10* | (2006.01) |
| *H05B 6/50* | (2006.01) |
| *B23K 9/235* | (2006.01) |
| *B23K 9/29* | (2006.01) |
| *B23K 9/32* | (2006.01) |

(Continued)

(52) U.S. Cl.
CPC ............ *B23K 9/1093* (2013.01); *B23K 9/122* (2013.01); *B23K 9/124* (2013.01); *B23K 9/1336* (2013.01); *B23K 9/173* (2013.01); *B23K 9/235* (2013.01); *B23K 9/295* (2013.01); *B23K 9/32* (2013.01); *H05B 6/101* (2013.01); *H05B 6/50* (2013.01)

(58) Field of Classification Search
CPC . H05B 6/02; H05B 6/101; H05B 6/50; B23K 9/00; B23K 9/092; B23K 9/095; B23K 9/1093; B23K 9/122; B23K 9/133; B23K 9/1336; B23K 9/14; B23K 9/167; B23K 9/173; B23K 9/20; B23K 9/202; B23K 9/235; B23K 9/28; B23K 9/287; B23K 9/295; B23K 9/32
USPC ........ 219/130.1, 136, 137.2, 137.31, 137.44, 219/138, 139, 600–602, 614–617
See application file for complete search history.

(56) References Cited

U.S. PATENT DOCUMENTS

| | | | |
|---|---|---|---|
| 4,580,026 A | 4/1986 | Stol | |
| 8,357,876 B1 * | 1/2013 | Allford | ................ B23K 9/0213 219/136 |

(Continued)

FOREIGN PATENT DOCUMENTS

| | | |
|---|---|---|
| DE | 102012024708 A1 | 6/2014 |
| GB | 1191187 A | 5/1970 |
| JP | 2010227947 A * | 10/2010 |

OTHER PUBLICATIONS

European Patent Office, Extended European Search Report for the corresponding European Patent Application No. 17210167.7 dated Jan. 31, 2018.

(Continued)

*Primary Examiner* — Hung D Nguyen
(74) *Attorney, Agent, or Firm* — Brooks Kushman P.C.

(57) ABSTRACT

A welding system and a method of control. The welding system may include a weld gun that may have an induction coil and a guide sleeve. The induction coil may heat a welding electrode in the weld gun. The guide sleeve may inhibit the welding electrode from engaging the induction coil.

20 Claims, 2 Drawing Sheets

(51) Int. Cl.
*B23K 9/00* (2006.01)
*B23K 13/01* (2006.01)

(56) References Cited

U.S. PATENT DOCUMENTS

2006/0124622 A1* 6/2006 Hubinger ............... B23K 9/124
219/137.31
2010/0059493 A1 3/2010 McAninch

OTHER PUBLICATIONS

European Patent Office, Extended European Search Report for the corresponding European Patent Application No. 16204015.8 dated Jul. 12, 2017.
Tough Gun CA3, Robotic Air-Cooled MIG Gun, Index No. CA3/1.8, Issued Jan. 2016.

* cited by examiner

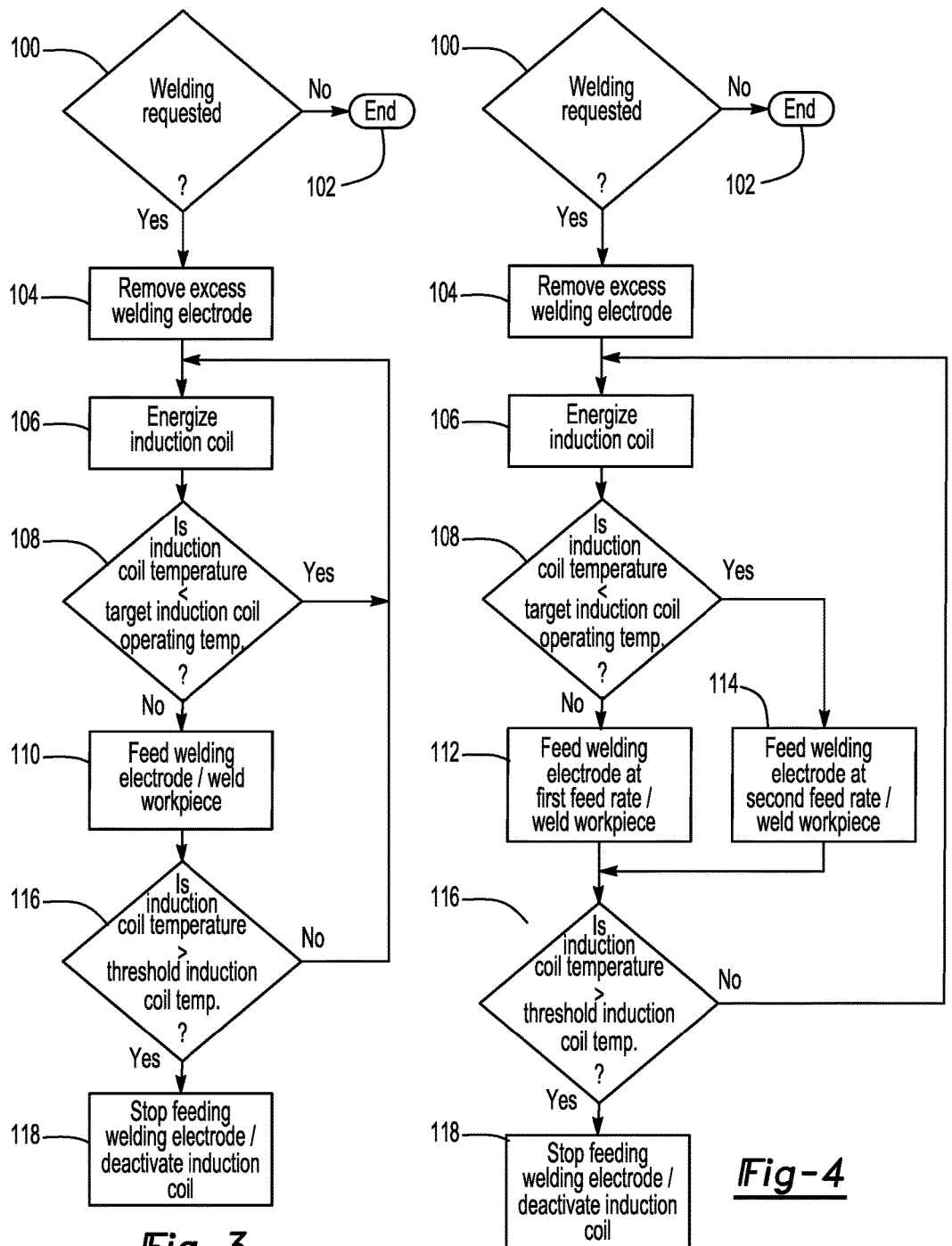

WELDING SYSTEM AND METHOD OF CONTROL

TECHNICAL FIELD

This disclosure relates to a welding system and a method of control.

BACKGROUND

An inductive heating coil that is elastically mounted at a welding gun is disclosed in German Patent Application No. 10 2012 024 708 A1.

SUMMARY

In at least one embodiment, a welding system is provided. The welding system may include a weld gun and a welding electrode. The weld gun may include an induction coil, a guide sleeve, and a nozzle. The induction coil may be arranged in a spiral to create an induction coil passage. The guide sleeve may be disposed adjacent to an end of the induction coil and may have a guide sleeve hole. The nozzle may be disposed adjacent to the guide sleeve and may have a nozzle outlet. The welding electrode may be heated inside the weld gun by the induction coil when the welding electrode is fed through the induction coil passage. The welding electrode may then be fed through the guide sleeve hole and the nozzle. The guide sleeve may inhibit the welding electrode from engaging the induction coil.

In at least one embodiment, a method of controlling a welding system is provided. The method may include feeding a welding electrode through a weld gun such that the welding electrode is fed through an induction coil, a guide sleeve, and a nozzle of the weld gun. The induction coil and the guide sleeve may be completely disposed inside the weld gun. The welding electrode may be heated by the induction coil to a temperature that is less than a melting temperature of the welding electrode.

BRIEF DESCRIPTION OF THE DRAWINGS

FIGS. 3 and 4 are flowcharts of methods of controlling the welding system.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
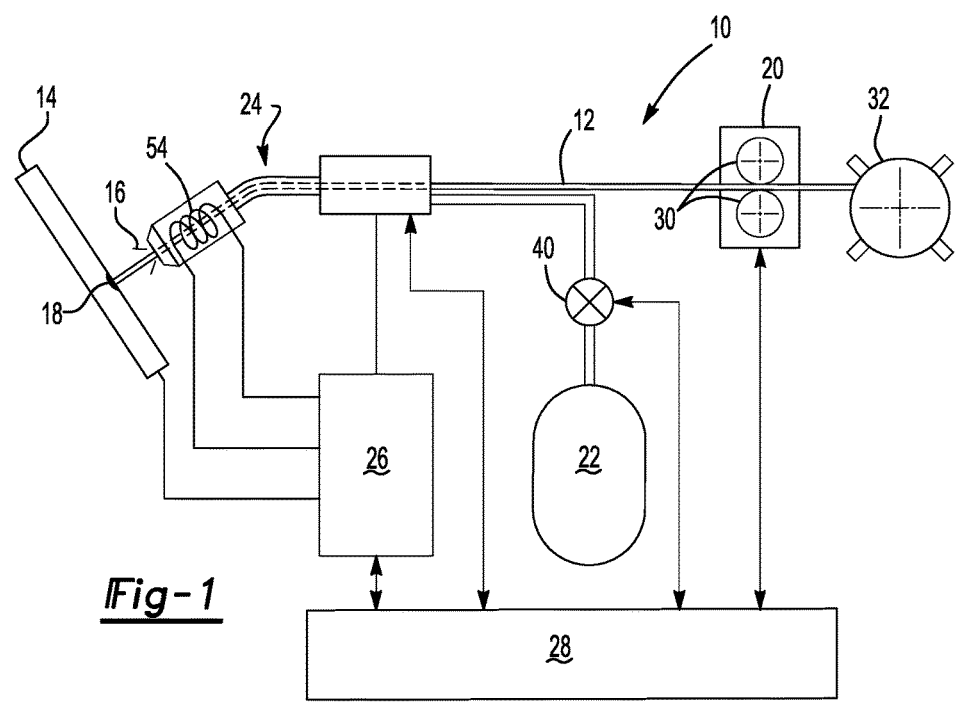
FIG. 1 illustrates an exemplary welding system.

Referring to FIG. 1, an exemplary welding system 10 is shown. The welding system 10 may be a gas metal arc welding system, such as a metal inert gas (MIG) welding system in which an electric arc is struck between a consumable welding electrode 12 and a metal workpiece 14. The electric arc may heat the welding electrode 12 and the workpiece 14, causing the welding electrode 12 to melt within the arc and be deposited on the workpiece 14 as a filler material. A shielding gas 16 may be provided throughout the welding process to protect the weld 18 from atmospheric contamination that may occur during solidification of the weld 18. In at least one embodiment, the welding system 10 may include a welding electrode feeder 20, a shielding gas supply 22, a weld gun 24, a power supply 26, and a control system 28.

The welding electrode feeder 20 may feed the welding electrode 12 to the weld gun 24. The welding electrode feeder 20 may be of any suitable type. For example, the welding electrode feeder 20 may include one or more feed rollers 30 that may rotate to actuate the welding electrode 12 toward the weld gun 24. The welding electrode feeder 20 may be disposed between the weld gun 24 and a spool 32 that may supply the welding electrode 12. The welding electrode feeder 20 may unwind the welding electrode 12 from the spool 32 when the welding electrode feeder 20 actuates the welding electrode 12. As such, the welding electrode feeder 20 may help continuously feed the welding electrode 12 to the weld gun 24 when activated. The welding electrode 12 may be of any suitable type. For instance the welding electrode 12 may be configured as a solid metal wire or a hollow metal tube.

The shielding gas supply 22 may supply the shielding gas 16 to the weld gun 24. The shielding gas 16 may help protect the weld 18 from atmospheric contamination or atmospheric gases, such as oxygen, which may cause defects in the weld 18. The shielding gas 16 may be of any suitable type. For instance, the shielding gas 16 may be a pure inert gas, such as argon or helium, pure carbon dioxide, or a mixture of multiple gases. The composition of the shielding gas 16 may be selected based on various factors, such as the type of material being welded and attributes of the welding process. The shielding gas supply 22 may be configured as a tank that may provide the shielding gas 16 under pressure to the weld gun 24 via a conduit, such as a tube or hose. A gas flow control valve 40 may be disposed between the shielding gas supply 22 and the weld gun 24 to control the flow of shielding gas 16 to the weld gun 24.

Figure 2:
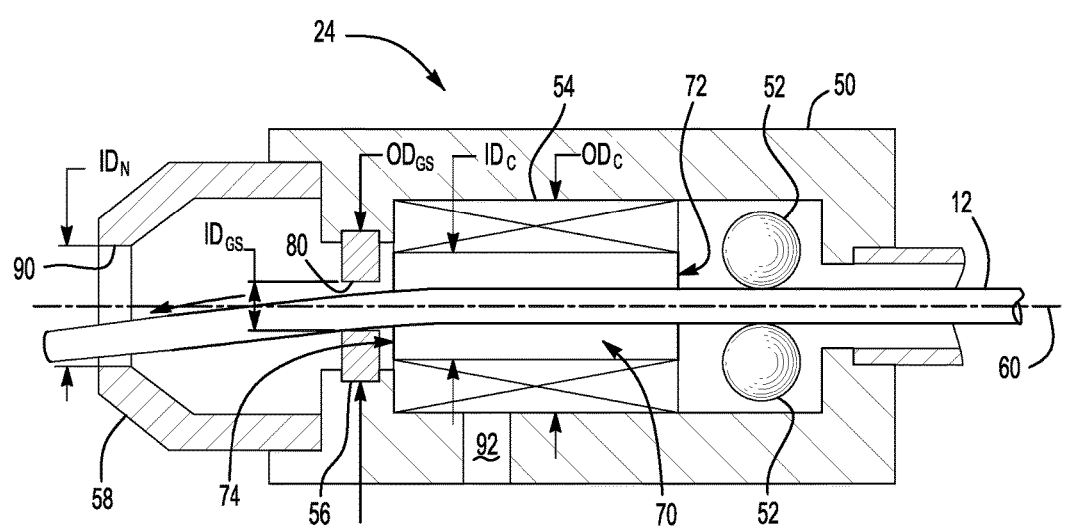
FIG. 2 is a section view of an exemplary weld gun that may be provided with the welding system.

Referring to FIGS. 1 and 2, an example of a weld gun 24 is shown. The weld gun 24, which may also be called a welding torch, may provide the welding electrode 12 and the shielding gas 16 to the workpiece 14 to facilitate formation of the weld 18. The weld gun 24 may be handheld or may be mounted on a manipulator, such as a multi-axis robotic manipulator. In at least one embodiment, the weld gun 24 may include a housing 50, one or more rollers 52, an induction coil 54, a guide sleeve 56, and a nozzle 58.

The housing 50 may receive and facilitate mounting of components of the weld gun 24. The housing 50 may also allow the weld gun 24 to be grasped by an operator or secured to a manipulator. In addition, the housing 50 may route or direct the welding electrode 12 and the shielding gas 16 to the location at which the weld 18 is to be provided on the workpiece 14.

The rollers 52, if provided, may be positioned in the housing 50 and may engage and support the welding electrode 12. In the embodiment shown in FIG. 2, a pair of rollers 52 is provided in which the rollers 52 are located opposite each other and on opposite sides of the welding electrode 12. The rollers 52 may be positioned adjacent to the induction coil 54. For example, the rollers 52 may be positioned at an end of the induction coil 54 that may be disposed opposite the guide sleeve 56.

The rollers 52 may help position the welding electrode 12 along an axis 60 inside the weld gun 24. In addition, the rollers 52 may help actuate the welding electrode 12 through the weld gun 24 along the axis 60. For instance, one or more rollers 52 may be operatively connected to an actuator that may rotate a roller 52 about its roller axis. As such, actuation of a roller 52 may cause the roller 52 to rotate and exert force on the welding electrode 12 and actuate the welding electrode 12 toward the nozzle 58. The rollers 52 may also help inhibit buckling of the welding electrode 12 inside the weld gun 24.

The induction coil 54 may be completely disposed inside the weld gun 24. For instance, the induction coil 54 may be disposed in the housing 50 in a fixed, stationary position. In FIG. 2, the induction coil 54 is axially positioned between the rollers 52 and the guide sleeve 56 and outside of the nozzle 58. The induction coil 54 made be located near the nozzle 58 so that the welding electrode 12 is heated by the induction coil 54 in close proximity to the workpiece 14.

The induction coil 54 may be configured as a coil of electrically conductive material that may be arranged in a spiral that may extend around the axis 60. The induction coil 54 may be spaced apart from the axis 60, thereby creating an induction coil passage 70. The induction coil passage 70 may extend from an inlet 72 that may be disposed at a first end of the induction coil 54 to an outlet 74 that may be disposed opposite the inlet 72 and at a second end of the induction coil 54. The welding electrode 12 may enter the induction coil passage 70 at the inlet 72 and may exit the induction coil passage 70 at the outlet 74. The induction coil 54 may have an inside diameter, designated $ID_C$, and an outside diameter, designated $OD_C$. The inside diameter $ID_C$ may be the diameter of the induction coil passage 70.

The induction coil 54 may heat the welding electrode 12 via electromagnetic induction and without contact between the welding electrode 12 and the induction coil 54. As such, the welding electrode 12 may be heated by the induction coil 54 while the welding electrode 12 is fed through the induction coil 54. The induction coil 54 may be controlled in a manner that heats the welding electrode 12 to a temperature that is less than its melting temperature. The melting temperature of the welding electrode 12 may vary based on the material from which the welding electrode 12 is made and the configuration of the welding electrode 12 (e.g., whether the welding electrode is solid or hollow). As one example, the welding electrode 12 may be heated by the induction coil 54 to a temperature that is around 1400° F. (760° C.). Heating of the welding electrode 12 in the weld gun 24 by the induction coil 54 before striking the electrical arc may allow a weld 18 to be provided at a faster rate since less energy needs to be provided by the electrical arc to reach the melting point of the welding electrode 12 and apply the weld 18. Heating the welding electrode 12 with the induction coil 54 may also remove moisture or condensation from the welding electrode 12 that may otherwise affect weld quality.

The guide sleeve 56 may be completely disposed inside the weld gun 24. For instance, the guide sleeve 56 may be disposed in the housing 50 in a fixed, stationary position. In FIG. 2, the guide sleeve 56 is positioned along the axis 60 between the induction coil 54 and the nozzle 58. As such, the guide sleeve 56 may be disposed adjacent to the second end of the induction coil 54 and may be disposed outside of the induction coil passage 70. The guide sleeve 56 made also be located in close proximity to the nozzle 58 to help support the welding electrode 12.

The guide sleeve 56 may be configured as a ring that may extend around the axis 60. The guide sleeve 56 may be spaced apart from the axis 60, thereby creating a guide sleeve hole 80. The guide sleeve hole 80 may be a through hole that may extend through the guide sleeve 56 and may be centered about the axis 60. As such, the guide sleeve hole 80 may be coaxially disposed with the induction coil passage 70. The welding electrode 12 may pass through the guide sleeve hole 80 to reach the nozzle 58. The guide sleeve 56 may have an inside diameter, designated $ID_{GS}$, and an outside diameter, designated $OD_{GS}$. The inside diameter $ID_{GS}$ may be the diameter of the guide sleeve hole 80. The inside diameter of the guide sleeve 56 may be less than the inside diameter of the induction coil 54 ($ID_{GS} < ID_C$).

The guide sleeve 56 may inhibit the welding electrode 12 from engaging the induction coil 54 and the nozzle 58. For example, the guide sleeve 56 may support the welding electrode 12 if the welding electrode 12 bends or deflects from the axis 60 after exiting the induction coil 54. More specifically, guide sleeve 56 may support the welding electrode 12 and inhibit or prevent the welding electrode 12 from engaging the induction coil 54 since it has a smaller inside diameter than the induction coil 54. Similarly, the guide sleeve may support the welding electrode 12 in a manner that inhibits or prevents the welding electrode 12 from engaging the nozzle 58.

The nozzle 58, which may also be called a tip, may be disposed at an end of the weld gun 24. For instance, the nozzle 58 may be disposed at an end of the housing 50. The nozzle 58 may be disposed adjacent to the guide sleeve 56. The nozzle 58 may be generally configured as a ring that may extend around the axis 60. The nozzle 58 may have a nozzle outlet 90 that may be centered about the axis 60. The welding electrode 12 and the shielding gas 16 may exit the nozzle 58 and the weld gun 24 via the nozzle outlet 90. As such, the nozzle outlet 90 may direct the shielding gas 16 in a substantially even manner around the welding electrode 12 into the welding zone to help protect the weld 18 from the surrounding air. The nozzle outlet 90 may have an inside diameter, designated $ID_N$, that may be larger than the inside diameter of the guide sleeve 56 ($ID_N > ID_{GS}$). As such, the nozzle outlet 90 may have a larger diameter than the guide sleeve hole 80.

Referring to FIG. 1, the power supply 26 may provide electrical energy to components of the welding system 10. For example, the power supply 26 may provide electrical energy to the welding electrode feeder 20, an actuator for the gas flow control valve 40 and the induction coil 54. The power supply 26 may also be electrically connected to the welding electrode 12 and the workpiece 14 to facilitate striking the electric arc between the welding electrode 12 and the workpiece 14. The power supply 26 may be of any suitable type. For example, the power supply 26 may be a source of direct-current may have a constant voltage for providing the electric arc and may provide alternating current to the induction coil 54 in one or more embodiments. In addition, it is contemplated that the power supply 26 may be provided in separate units or modules. For instance, a module for powering the induction coil 54 may be added to a welding system to power the induction coil 54 without having to replace or retrofit a power supply 26 that already provides electrical energy for striking an electric arc and providing other welding system components.

The control system 28 may monitor and control operation of the welding system 10. The control system 28 may be a microprocessor-based control system that may include one or more electronic controllers or control modules that may monitor and/or control various components of the welding system 10. For example, the control system 28 may be configured to control operation of the welding electrode feeder 20, shielding gas supply 22 (e.g., actuation of the gas flow control valve 40), weld gun 24, and power supply 26. In addition, the control system 28 may be configured to receive data from one or more sensors, such as a sensor 92 that may detect or provide a signal indicative of the temperature of the induction coil 54 and/or the temperature of the welding electrode 12 as shown in FIG. 2. Such a sensor 92 may be provided with the weld gun 24. In FIG. 1, communication between the control system 28 and these components is represented by the double arrowed lines located adjacent to the control system 28.

Referring to FIG. 3, a flowchart of an exemplary method of control of the welding system 10 is shown. As will be appreciated by one of ordinary skill in the art, the flowchart represents control logic which may be implemented or affected in hardware, software, or a combination of hardware and software. For example, the various functions may be affected by a programmed microprocessor. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multi-tasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope intended.

In at least one embodiment, the method may be executed by the control system 28 and may be implemented as a closed loop control system.

At block 100, the method may determine whether welding is requested. Welding may be requested based on a command that may be provided by control command or an on/off switch like a trigger switch that may provide a signal indicative that welding is requested. If welding is not requested, then the method or method iteration may end at block 102. If welding is requested, then the method may continue at block 104.

At block 104, excess welding electrode, if present, may be removed from the weld gun 24. For example, a portion of the welding electrode 12 may extend out of the weld gun 24 through the nozzle outlet 90 when the welding electrode 12 has previously been fed through the weld gun 24. This portion of the welding electrode 12 has already passed through the induction coil 54. As such, this portion of the welding electrode 12 cannot be readily heated by the induction coil 54 and may be mechanically severed with a cutting tool to reduce the amount of welding electrode 12 that may not be heated by the induction coil 54.

At block 106, the induction coil may be energized. The induction coil 54 may be energized by providing current from the power supply 26 to the induction coil 54. Providing current to the induction coil 54 may increase the temperature of the induction coil 54 and may increase the temperature of the welding electrode 12 via induction. The current provided to the induction coil 54 may be configured to heat the induction coil 54 to a target induction coil operating temperature. In addition, the current provided to the induction coil 54 may be configured to heat the welding electrode 12 to a temperature that is less than the melting temperature of the welding electrode 12. As a result, the welding electrode 12 may soften and become more flexible but may not melt when inductively heated by the induction coil 54.

At block 108, the temperature of the induction coil may be compared to the target induction coil operating temperature. The temperature of the induction coil 54 may be based on the signal from the sensor 92. If the temperature of the induction coil 54 is less than the target induction coil operating temperature, then the method may continue to energize the induction coil 54 and increase the temperature of the induction coil 54 and the welding electrode 12 at block 106. If the temperature of the induction coil 54 is not less than the target induction coil operating temperature, then the method may continue at block 110.

At block 110, the welding electrode may be fed through the weld gun to weld the workpiece. The welding electrode 12 may be fed through the weld gun 24 by the welding electrode feeder 20 and the rollers 52 in the weld gun 24 if provided. As is best shown in FIG. 2, the welding electrode 12 may be substantially aligned with the axis 60 when fed through the induction coil 54. Upon exiting the induction coil 54, the welding electrode 12 may flex and may bend away from the axis 60 in response to gravity or inertial forces associated with movement of the weld gun 24. Sufficient force exerted on the welding electrode 12 may cause the welding electrode 12 to engage the guide sleeve 56, which in turn may support the welding electrode 12 as the welding electrode 12 is fed through the guide sleeve hole 80. As such, the welding electrode 12 may slide across the guide sleeve 56 and the guide sleeve 56 may inhibit the welding electrode 12 from engaging the induction coil 54 regardless of orientation of the weld gun 24. In addition, the guide sleeve 56 may support the welding electrode 12 and may inhibit the welding electrode 12 from engaging the nozzle 58, which may otherwise clog the nozzle outlet 90.

At block 116, the temperature of the induction coil may be compared to a threshold induction coil temperature. The threshold induction coil temperature may be indicative of a temperature at which operation of the weld gun 24 may be compromised. For instance, the welding electrode 12 may become too pliable or flexible to be properly fed through the weld gun 24 when the threshold induction coil temperature is exceeded. If the temperature of the induction coil 54 is not greater than a threshold induction coil temperature, then the method may continue at block 106, where the induction coil 54 may remain energized and feeding of the welding electrode 12 and welding of the workpiece 14 may continue. If the temperature of the induction coil 54 is greater than the threshold induction coil temperature, then the method may continue at block 118.

At block 118, welding operations may be terminated to help prevent damage to the weld gun. For example, the induction coil 54 may be deactivated or not energized and feeding of the welding electrode 12 through the weld gun may be stopped. Alternatively, the current provided to the induction coil 54 may be decreased by a predetermined amount to reduce heating of the welding electrode 12. These actions may allow the welding electrode 12 to cool and not clog or damage the weld gun 24.

Referring to FIG. 4, another flowchart of a method of controlling the welding system 10 is shown. This flowchart is similar to that shown in FIG. 3, but allows the welding electrode 12 to be fed through the weld gun 24 before the temperature of the induction coil 54 reaches the target induction coil operating temperature. As such, block 110 in FIG. 3 is replaced with blocks 112 and 114. At block 108, if the temperature of the induction coil is less than the target induction coil operating temperature, then the welding electrode 12 may be fed at a first feed rate through the weld gun at block 112. If the temperature of the induction coil 54 is not less than the target induction coil operating temperature, then the welding electrode 12 may be fed at a second feed rate through the weld gun at block 114. The second feed rate may be greater than the first feed rate. As such, the welding electrode 12 may be fed at a faster speed when the welding electrode 12 is sufficiently heated by the induction coil 54 than when the welding electrode 12 has not been sufficiently heated.

The welding system and method of control may not be adapted for use with other welding techniques that do not employ consumable welding electrode, such as laser welding or friction welding.

The system and method described above may allow a welding electrode to be preheated so that the welding electrode is at an elevated temperature that is closer to its melting point when exiting the weld gun. As such, preheating the welding electrode may allow the welding electrode to be fed through the weld gun at a faster feed rate and/or may allow the weld gun to be moved with respect to the workpiece to generate a weld at a faster feed rate as compared to a welding system that does not preheat the welding electrode. In addition, the system and method may allow a thicker or larger diameter welding electrode to be used to apply a weld at a faster feed rate as compared to a welding system that does not preheat the welding electrode. As such, a wider or larger weld may be provided without reducing cycle time. The system and method may allow moisture or condensation to be removed from the surface of the welding electrode in the weld gun, which in turn may eliminate coil baking operations in which a spool or coil of the welding electrode may be baked or heated in an oven or furnace before being used by the welding system, thereby reducing cost and complexity. The system and method may also be retrofitted to existing weld systems and may help improve the flexibility of the welding system. For instance, preheating welding electrodes in the weld gun may allow the number of welding electrode stock sizes that are kept in inventory to be reduced. Furthermore, the system and method may help reduce distortion of the workpiece and reduce weld splatter as less heating needs to be provided by the electric arc to execute a weld.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A welding system comprising:
   a weld gun that includes:
      an induction coil that is arranged in a spiral to create an induction coil passage;
      a guide sleeve that is disposed adjacent to an end of the induction coil and that has a guide sleeve hole; and
      a nozzle that is disposed adjacent to the guide sleeve and that has a nozzle outlet; and
   a welding electrode that is heated inside the weld gun by the induction coil when the welding electrode is fed through the induction coil passage and then fed through the guide sleeve hole and the nozzle, wherein the guide sleeve is not disposed in the induction coil passage or the nozzle and is engageable with the welding electrode to inhibit the welding electrode from engaging the induction coil.

2. The welding system of claim 1 wherein an outside diameter of the induction coil is greater than an outside diameter of the guide sleeve.

3. The welding system of claim 1 wherein an inside diameter of the guide sleeve is less than an inside diameter of the induction coil passage.

4. The welding system of claim 1 wherein the guide sleeve inhibits the welding electrode from touching the nozzle.

5. The welding system of claim 1 wherein the welding electrode is heated by the induction coil to a temperature that is less than a melting temperature of the welding electrode.

6. The welding system of claim 1 wherein the welding electrode is heated by the induction coil to a temperature at which condensation is removed from the welding electrode before the welding electrode exits the nozzle outlet.

7. The welding system of claim 1 wherein the induction coil and guide sleeve are disposed along an axis and the induction coil has an inlet and an outlet disposed opposite the inlet, wherein the welding electrode enters the induction coil passage at the inlet and exits the induction coil passage at the outlet.

8. The welding system of claim 7 further comprising a pair of rollers that are disposed adjacent to the induction coil at an end of the induction coil that is disposed opposite the guide sleeve, wherein the welding electrode is fed between the pair of rollers and supported by the pair of rollers to position the welding electrode along the axis when entering the induction coil passage.

9. A method of controlling a welding system, comprising:
   feeding a welding electrode through a weld gun such that the welding electrode is fed through a pair of rollers, an induction coil, a guide sleeve, and a nozzle of the weld gun, wherein the induction coil and the guide sleeve are completely disposed inside the weld gun and the welding electrode is heated by the induction coil to a temperature that is less than a melting temperature of the welding electrode, the pair of rollers, the induction coil, and the guide sleeve are received inside a housing of the weld gun, and the pair of rollers position the welding electrode along an axis when entering an induction coil passage of the induction coil.

10. The method of claim 9 wherein the guide sleeve inhibits the welding electrode from engaging the induction coil.

11. The method of claim 9 wherein the nozzle provides the welding electrode to a workpiece that is to be welded.

12. The method of claim 9 further comprising heating the induction coil to a target induction coil operating temperature before feeding the welding electrode.

13. The method of claim 12 further comprising removing a portion of the welding electrode that extends out of the nozzle before heating the induction coil.

14. The method of claim 13 further comprising monitoring a temperature of the induction coil and stopping feeding of the welding electrode and deactivating the induction coil when the temperature of the induction coil exceeds a threshold induction coil temperature.

15. The method of claim 9 further comprising feeding the welding electrode through the weld gun with the pair of rollers and the pair of rollers are disposed adjacent to a first end of the induction coil.

16. The method of claim 9 further comprising feeding the welding electrode at a first feed rate when the induction coil has a temperature that is less than a target induction coil operating temperature and feeding the welding electrode at a second feed rate that is greater than the first feed rate when the temperature of the induction coil is at least the target induction coil operating temperature.

17. The method of claim 16 further comprising monitoring a temperature of the induction coil and stopping feeding of the welding electrode when the temperature of the induction coil exceeds a threshold induction coil temperature.

18. The method of claim 9 wherein the induction coil and guide sleeve are arranged along an axis, the welding electrode is fed along the axis into the induction coil, and the welding electrode bends such that the welding electrode is not coaxially disposed with the axis after exiting the induction coil.

19. The method of claim 18 wherein the guide sleeve supports the welding electrode such that the welding electrode does not engage the induction coil regardless of orientation of the weld gun.

20. A welding system comprising:
a weld gun that includes:
an induction coil that is arranged in a spiral to create an induction coil passage;
a guide sleeve that is disposed adjacent to an end of the induction coil and that has a guide sleeve hole; and
a nozzle that is disposed adjacent to the guide sleeve and that has a nozzle outlet; and
a welding electrode that is heated inside the weld gun by the induction coil when the welding electrode is fed through the induction coil passage and then fed through the guide sleeve hole and the nozzle, wherein the welding electrode is the only component of the weld gun that is disposed in the induction coil passage and the guide sleeve inhibits the welding electrode from engaging the induction coil.

* * * * *